March 20, 1945. E. L. MARTIN 2,371,699
AIRCRAFT LANDING GEAR
Filed July 15, 1941 5 Sheets-Sheet 4
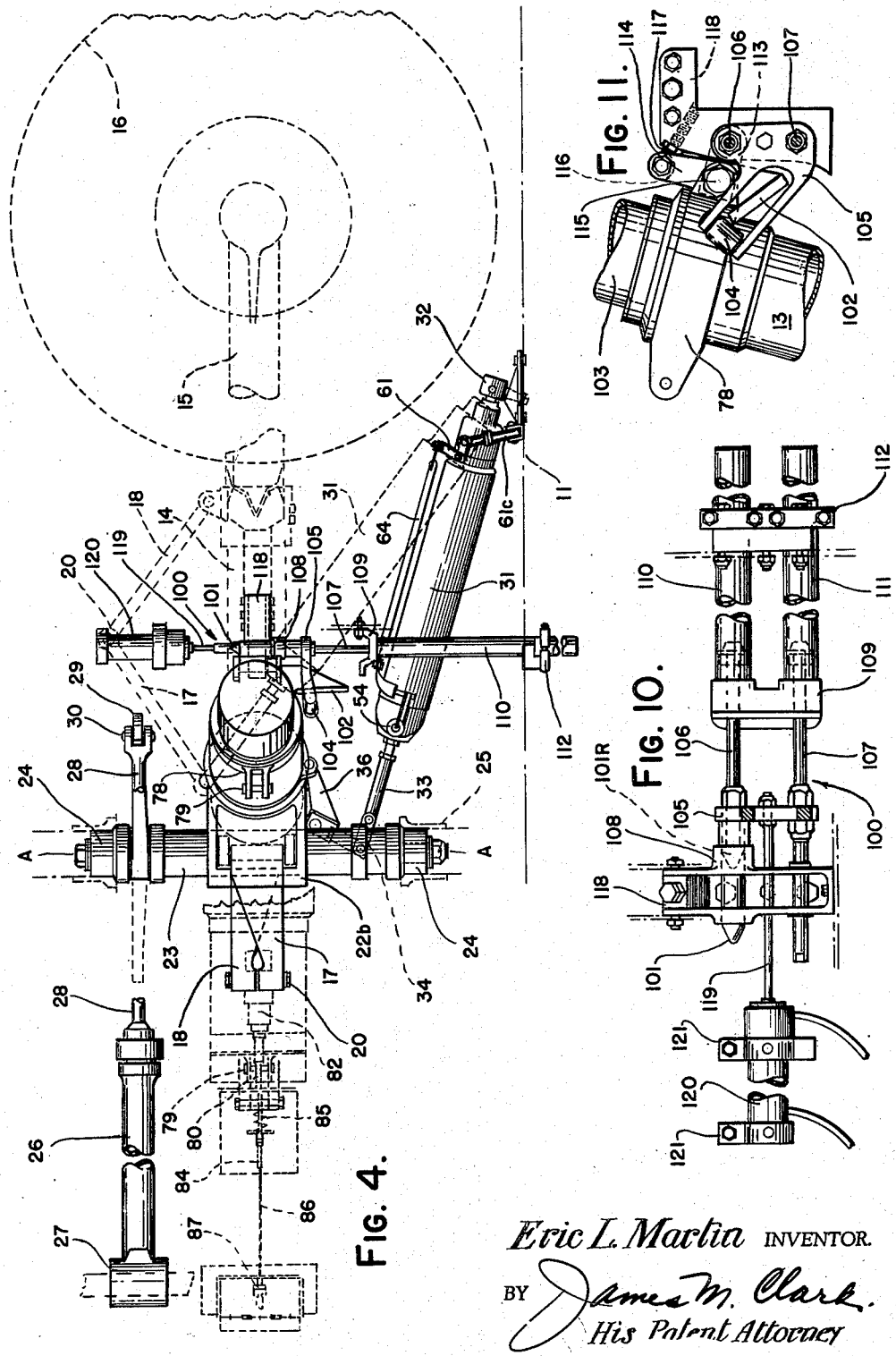
Eric L. Martin INVENTOR.
BY James M. Clark
His Patent Attorney

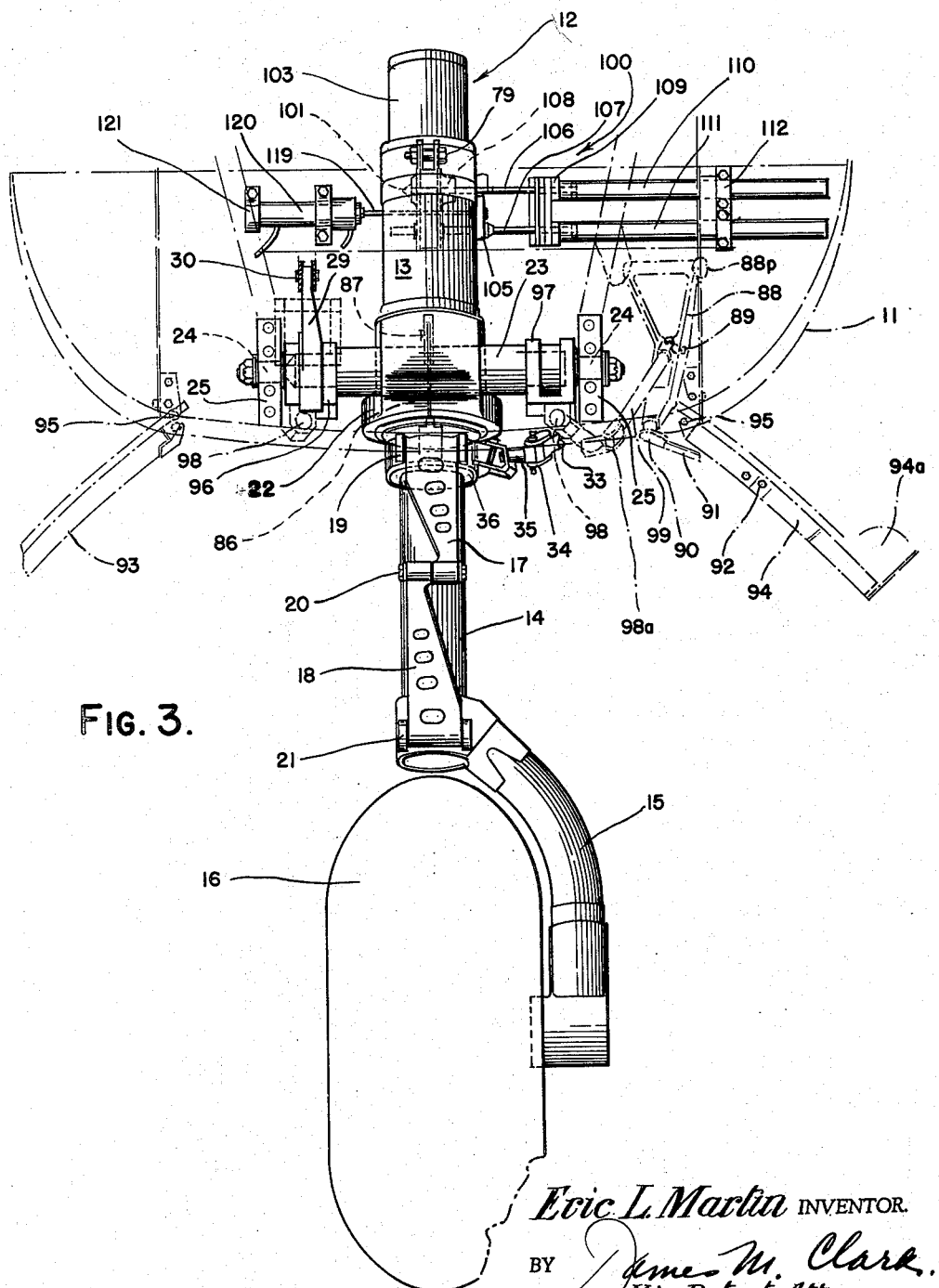

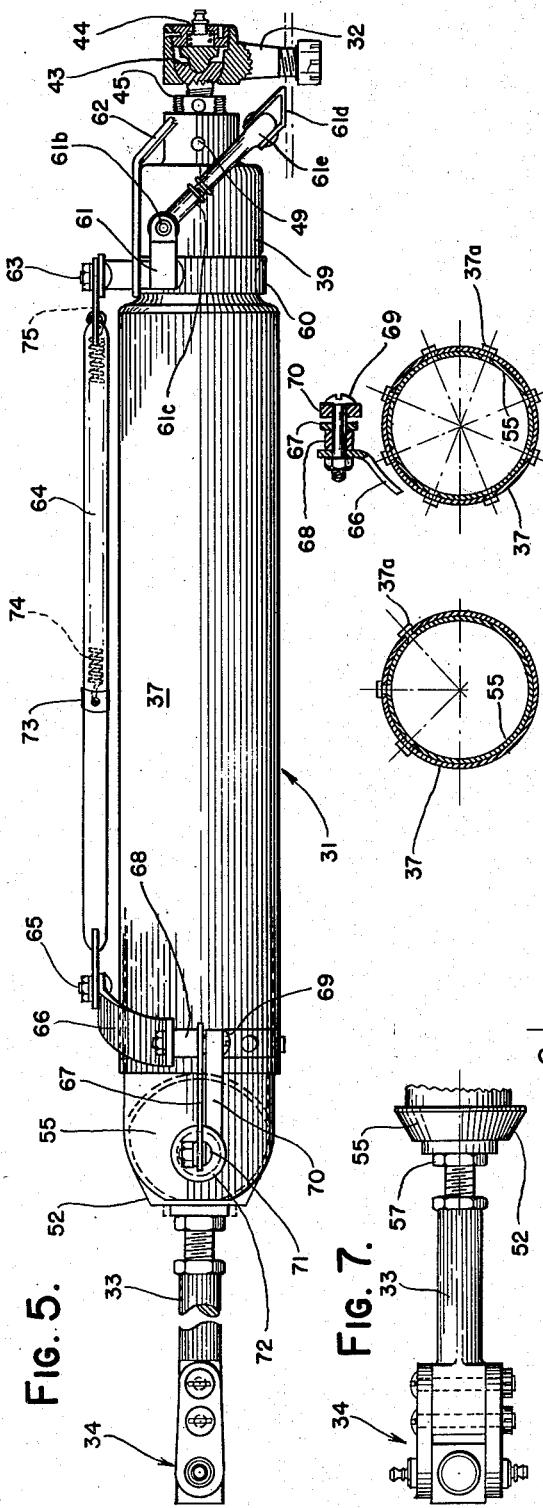

Patented Mar. 20, 1945

2,371,699

UNITED STATES PATENT OFFICE 2,371,699

AIRCRAFT LANDING GEAR

Eric L. Martin, Santa Monica, Calif., assignor to North American Aviation, Inc., Inglewood, Calif., a corporation of Delaware Application July 15, 1941, Serial No. 402,475

17 Claims. (Cl. 244—102)

The present invention relates to landing gears and more particularly to retractable nose wheels for aircraft.

This invention relates essentially to a retractable nose wheel or landing gear of the type which is capable of having its wheel rotated through approximately 90° between its extended and retracted positions to facilitate storage of the wheel within the airplane. The shock absorbing strut of the nose gear is pivotally carried upon the aircraft structure and the rotation of the wheel during retraction is accomplished by a fixed length strut which is universally mounted upon the aircraft structure and to the rotating element of the cantilever strut. This novel fixed length strut is also a self-contained oleo shock absorbing cylinder which when unlocked from its fixed length condition serves as a centralizing and stabilizing device for the wheel which is then free to resiliently castor within predetermined limits. In this unlocked condition the auxiliary strut in addition to absorbing torsional shocks in the main strut, serves to effect the elimination of hunting and as a shimmy dampener. The present landing gear invention also provides for hydraulic actuation by a simple and advantageous arrangement; locking devices for maintaining the gear in its operative and retracted positions and a novel locking arrangement for use with the auxiliary stabilizing strut. A modification is also contemplated in which the stabilizing strut would be utilized for steering purposes.

It is accordingly a major object of the present invention to provide a cantilevered landing gear which is capable of retraction by the use of a simplified mechanism which serves to rotate the landing wheel through 90° between retracted and extended positions. It is also an object of the present invention to provide a retractable landing gear particularly adapted as a nose wheel which is of simplified design, of improved operation and positive in its retracting action. It is a further object to provide such a landing gear which is selectively made to freely castor in its operative position. A further object resides in the provision of a novel means and method for rotating the cantilevered strut during retraction and extension of the gear whereby the wheel may be stored within the airplane in a flat or horizontal position, lying in a plane approximately at right angles to its vertical position when extended.

A still further object of the present invention resides in a novel drag link strut for accomplishing such rotation of the wheel strut and which also is capable of being selectively converted into an oleo strut by being unlocked from its fixed length condition whereby it then serves to stabilize and center the nose wheel in its normal or forwardly aligned position to dampen shimmying and eliminate hunting tendencies of the freely castoring wheel. It is a further object of the present invention to provide a retractable nose wheel which is particularly compact in arrangement and provides a novel door arrangement and operating mechanism for closing the aperture in the airplane body into which the wheel and its strut element are retracted and housed.

Other objects and advantages of the present invention will become apparent to those skilled in the art after a reading of the following description and the accompanying drawings forming a part hereof in which;

Fig. 3 is a front elevational view of the landing gear in the extended position;

Fig. 4 is a plan view of the two positions of the landing gear shown in Fig. 2;

Fig. 5 is an enlarged detailed plan view of the drag link strut;

Fig. 6 is a side elevation of the same shown partly in section;

Fig. 7 is a side elevation of the swingable terminal of the strut;

Fig. 8 is a cross sectional view of the strut taken along the lines 8—8 of Fig. 6;

Fig. 9 is a cross sectional view taken along the lines 9—9;

Fig. 10 is a front elevation of the locking mechanism for the gear when in the operative position;

Fig. 11 is a side view of an upper section of the strut and the associated mechanism for retracting the locking mechanism illustrated in Figure 10.

Figure 1:
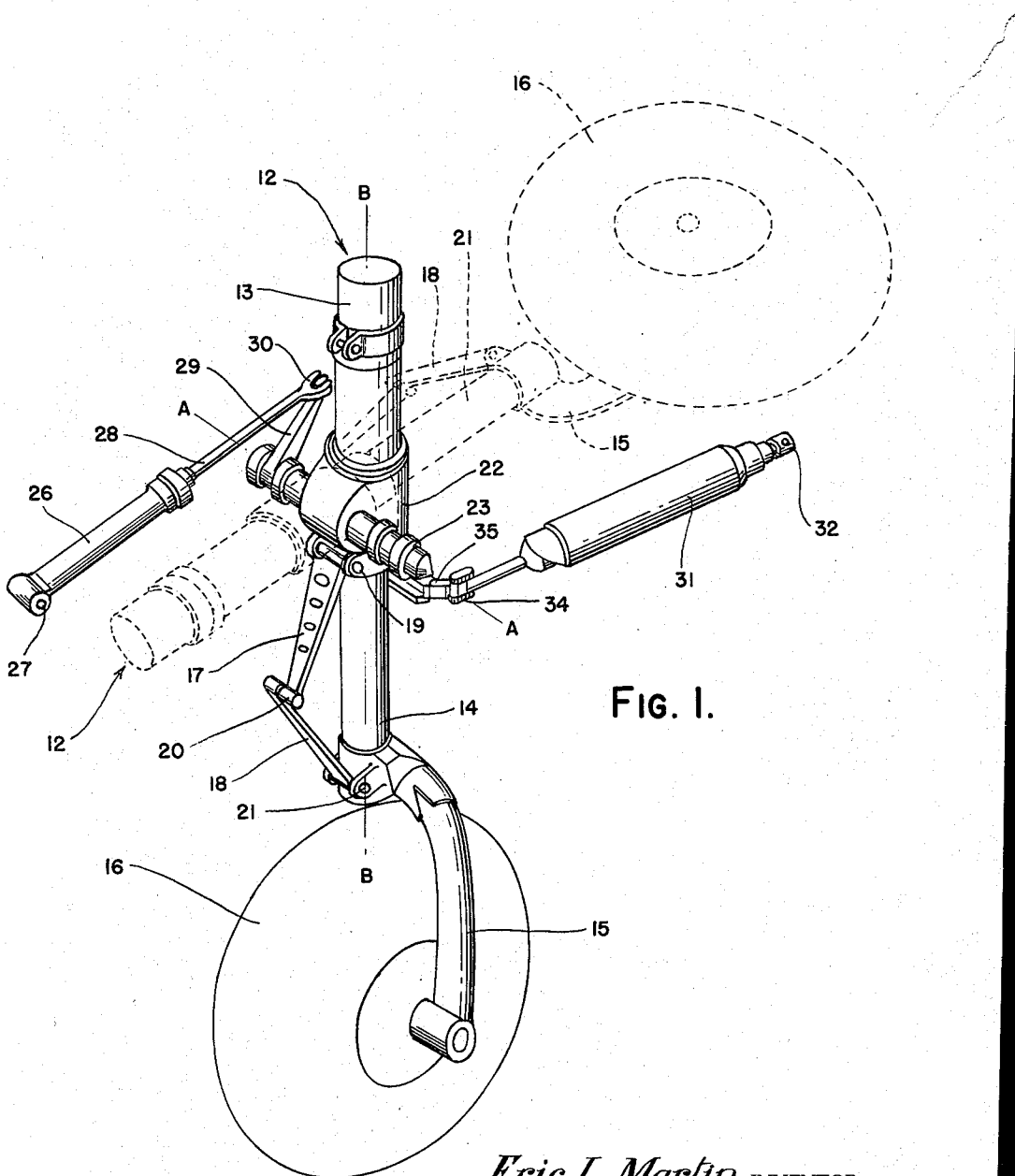
Fig. 1 is a perspective view showing the retractable landing gear removed from the airplane, in full lines in its operative position, and in dotted lines in its retracted position.
Figure 2:
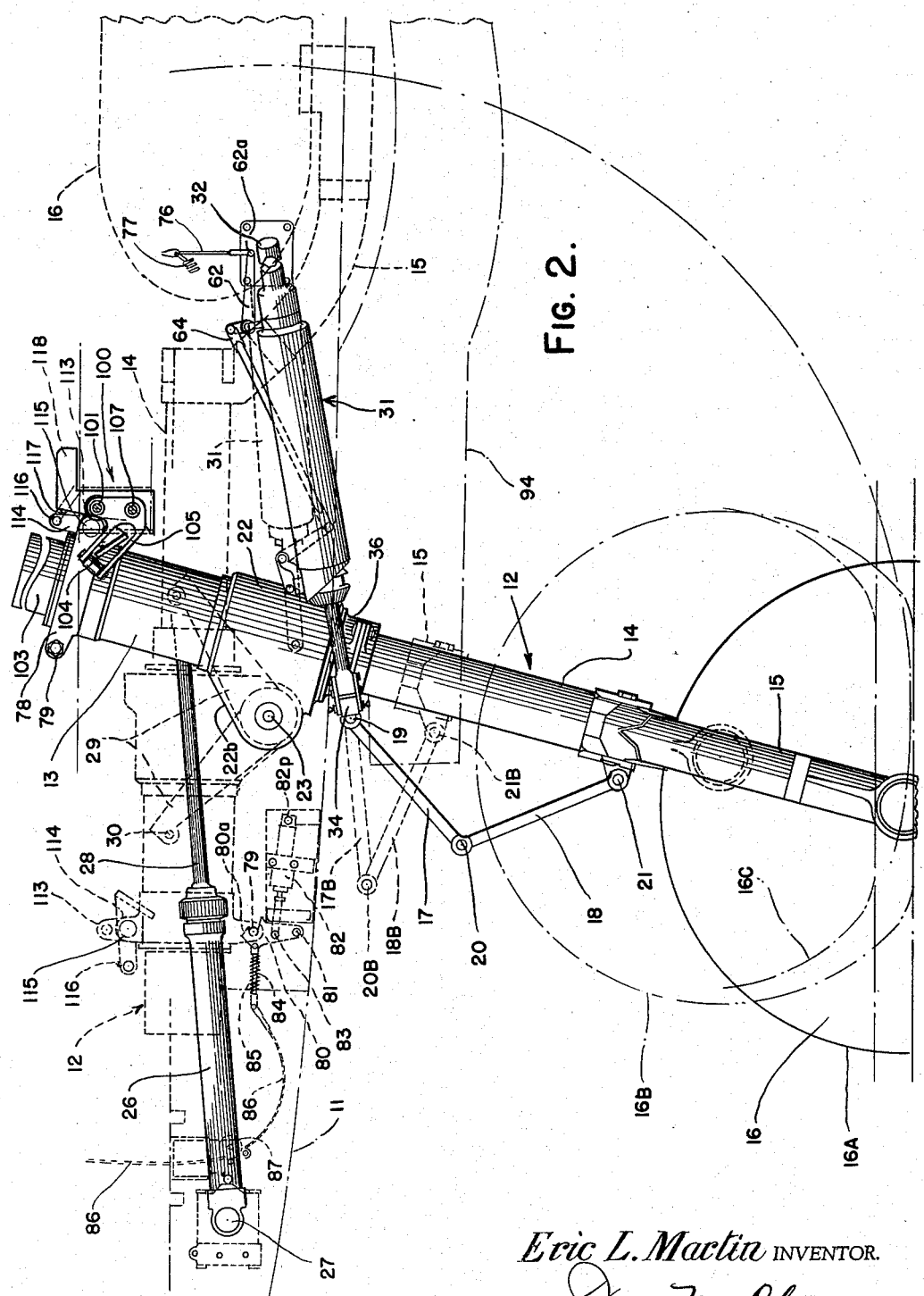
Fig. 2 is a side elevation of the same landing gear to a larger scale and its relationship to the portion of the aircraft from which it is supported.

Referring now to Figs. 1 and 2, the main shock absorbing landing gear strut is indicated by the numeral 12 having its upper or cylinder portion 13 substantially fully housed within the outline of the aircraft fuselage or nacelle 11, the cylinder portion 13 of the strut 12 serving to house the upper or piston portion of the lower telescoping strut 14. The cylinder 13 and piston 14 comprise a shock absorber combination of the oleo or other suitable type resiliently opposing generally vertical forces which tend to compact or telescope the combined strut 12.

At the lower terminal of the piston portion 14 there is rigidly attached the wheel-carrying member 15 from the hub end of which there is rotatably carried the landing wheel 16 or other ground engaging element. As viewed in the side elevation shown in Fig. 2, the fully extended unfolded position of the wheel is indicated by 16A, its statically loaded attitude shown at 16B and its fully loaded or compacted position is indicated at 16C. In order to maintain the angular attitude of the two otherwise relatively rotatable telescoping elements 13 and 14 a torque arrestor, commonly known also as a "nut-cracker" linkage is provided by the links 17 and 18 which are pivotally mounted at the pivots 19 and 21 the telescoping portions 13 and 14 respectively. The outer ends of the links 17 and 18 are intermediately pivoted by the pivot 20 such that in the statically loaded condition of the landing gear the torque arresting linkage is caused to fold up upon itself and the links take the position shown at 17b and 18b with its intermediate pivot at 20b, as shown in the dotted lines in Fig. 2. The lower pivot 21 is carried by the fitting which fixedly attaches the wheel-carrying member 15 to the piston portion 14. The upper pivot 19 is carried upon a collar fitting 36 carried within the strut support fitting 22 such that it is freely rotatable with respect thereto but is restrained from axial movement with respect to the fitting 22 and the remainder of the cylinder portion 13.

The strut support fitting 22, which is fixedly attached to the lower portion of the cylinder 13, is provided with a forwardly extending apertured portion 22b which is pivoted upon the transverse pivot shaft 23. This pivot shaft extends laterally on either side of the fitting 22 and is rotatably supported by the aircraft structure 25 in suitable journals or bearings 24 as more clearly shown in Fig. 4. The cantilever strut 12 is rockable about the transverse pivot 23 for extension and retraction by the hydraulic actuating cylinder 26 which is journalled upon the pivot 27 supported by the aircraft structure at the forward terminal of the cylinder 26. The axis A—A (Fig. 1) of the transverse shaft 23 normally extends transversely or spanwise of the airplane and the axis B—B of the wheel strut 12 in its extended position lies within a longitudinal plane which is perpendicular to the axis A—A, the axis B—B passing rearwardly of the axis A—A and extending downwardly and forwardly beneath the same as more clearly indicated in Fig. 2. The piston 28, reciprocable within the cylinder 26, is pivotally connected to the actuating lever arm 29 by the pivot 30, and the lever or torque arm 29 is keyed or otherwise fixedly attached to the pivot shaft 23, being disposed within one of the bifurcated door actuating elements 86 which will be hereinafter more fully described.

A main wheel strut 12 is rotated through 90° during extension and retraction by means of the stabilizing and centering cylinder assembly, or auxiliary strut 31. The latter is disposed to the side of the main strut 12, opposite to that on which the retracting cylinder 26 and torque arm 29 are located. As indicated in plan in Fig. 4 the assembly 31 has its rearmost terminal universally anchored to the fuselage structure by the ball and socket fitting 32, and in the extended position of the landing gear the assembly 31 extends forwardly and downwardly and toward the axis of the main strut 12 such that the axis of the cylinder assembly 31 intersects the vertical longitudinal plane of retraction of the main strut forward of the strut axis B—B. The cylinder assembly 31 is provided at its forward portion with an extension arm 33 which may preferably be either a solid rod, or tubular, in cross section, being provided at its forward terminal with a universal connection 34 to the torque arm fitting 35 of the collar 36.

As stated above, the upper or cylinder element 13 of the main strut 12 is fixed with respect to the strut support fitting 22 and the lower portion of the latter is formed to receive a collar fitting 36 which is free to rotate within the fitting 22 about the common axis B—B. At the same time it is arranged such that it bears axially against the fitting 22 through suitable anti-friction means serving as a guide for the piston portion 14 when the landing gear is loaded and the torque scissors 17-18 are caused to be folded into their "B" position. The pivot 19 for the upper torque links 17 is journalled within a bracket on the collar fitting 36 which also has extending laterally therefrom the torque arm fitting 35. The latter fitting is suitably apertured at its outer terminal to receive the pivot of the terminal fitting 34. Accordingly, an arrangement is provided whereby the cylinder assembly 31 when locked to its fixed length serves to maintain the wheel 16 in its forwardly directed or central position regardless of the degree of loading and resulting telescoping of the strut 12; and as the gear is retracted in the fixed length attitude of the assembly 31 it serves to rotate the collar fitting 36, and thereby also the wheel 16 through the torque scissors 17—18, with respect to the fitting 22.

The stabilizing and centering cylinder assembly 31 is more fully shown in the detailed Figs. 5 to 9 inclusive, wherein it will be noted that the assembly consists essentially of a tubular casing 37 enclosing a piston 38 and a cylinder 40. The casing 37 is rigidly attached through its extension portion 39 by means of the pins or other suitable attachment elements 49 to the piston 38. The latter is provided with a threaded terminal 43 engaged by the similarly threaded retaining ring 45 which in turn threadedly engages the aforementioned extension portion 39 and is pinned thereto in its adjusted position. The terminal fitting 43 also threadedly engages the retaining fitting 45 to which it is also pinned and is formed at its outer end into a semi-spherical portion, which is similarly recessed and is adapted to form the ball half of the ball and socket terminal within the above mentioned fitting 32 which is attached to the fuselage structure as shown in Fig. 4.

The other end of the piston rod 38 carries the piston 41 through the intermediacy of the retaining ring 41a, which it threadedly engages, and is locked to the end of the piston rod. The piston 41 is provided with a series of radially arranged metering ports or orifices 42 which extend longitudinally of the cylinder. The casing 37 and the piston 38 are therefore both universally anchored to the aircraft structure by means of the ball and socket 43 within the fitting 32, the ball of which is suitably retained in operative contact by the adjustable fitting 44 which is also provided with a suitable Alemite or other fitting which provides for suitable lubrication of the contact surfaces.

The piston 38 fits closely within the cylinder 40 which is provided with a cylinder and cap 46 threadedly engaging the cylinder end and suitably recessed for the cylinder packing 47 which permits the cylinder to move along the piston rod 38 in a fluid-tight relationship. This end of the cylinder 40 and its cap 46 are adapted to be guided within the bearing 48 which is suitably recessed to form a terminal stop for the cap 46 and is in turn provided with an outwardly extending flange portion which is adapted to be slidingly guided within the tubular casing 37.

Within the opposite end of the cylinder 40 there is provided a piston stop 50 and the cylinder is embraced by a bearing fitting 51 which has an outwardly extending flange portion fitting closely inside the tubular casing 37. The adjacent end of the cylinder 40 threadedly engages the cap fitting 52 which is provided with a central bore and a circumferentially disposed recess 53 with adjoining conical camming surfaces tapering toward both ends of the cap. The recess 53 is adapted to be engaged by the cylindrical locking pin 54 which is guided for radial movement with respect to the axis of the assembly, within the housing 55, being part of a truncated cylindrical extension of the casing 37 to which it is suitably riveted as at 37a. The outer end of the cylinder cap or detent fitting 52 is engaged by the threaded terminal 56 of the extension rod 33 being fixed thereto by the lock nuts 57.

Within the cylindrical casing 37 and exteriorly of the cylinder 40 there is disposed a coil spring 58 which bears against the outwardly extending flange of the bearing fitting 51 to which it is suitably attached, as well as at its opposite end to the spacer ring 59 which in turn bears against the outwardly extending flanged portion of the bearing sleeve 48 to which it is also attached. Suitable hydraulic fluid, which may preferably be one of the oils used in oleo shock absorbers, is supplied to almost entirely fill the spaces within the cylinder 40 both between the piston 41 and the cap terminal 52, and between the piston and the cylinder end cap 46. It will accordingly be seen that when the locking pin 54 is drawn outwardly from the recess 53 releasing the cylinder portion, any forces applied to the rod 33 tending to compress or extend the cylinder assembly 37, are resiliently opposed by the coil spring 58 and damped by the fluid flowing through the ports 42 in the pistons 41 tending to pass from one end of the cylinder to the other. It will also be seen that when such external forces are removed the coil spring 58 will again restore the cylinder 40 to its original central, or normal, relationship with respect to the piston 38 at which the locking pin 54 again readily becomes seated in the recess 53 of the cap 52 thereby locking the assembly into its normal fixed length.

As shown in Fig. 2 suitable control mechanism is provided whereby the pilot, or other operator, may latch or unlatch the cylinder assembly 37 at will. This mechanism comprises a cable 76 which is guided over suitable sheaves from a suitable manual control, and is connected to the apertured terminal 62a of the bellcrank lever 62. A suitable return tension spring 77 is attached to a fitting within the run of the cable 76 and to a suitable support on the cylinder assembly 37 permitting the pin 54 to be restored to its downwardly extending position with the assistance of the tension spring 74 as shown in Fig. 6. The bellcrank 62 is suitably pivoted on the bolt 61 which is carried by the split clamp 60 embracing the casing portion 39. The clamp 60 is provided with a bearing portion 60a for the pivot bolt 61 which also carries an apertured lug 61b, which is interconnected with the airplane structure 11 by the turnbuckle 61c, the U-shaped bracket 61d and the pin bolts 61e which secures the entire stabilizing unit against rotation.

It will be noted that the longer arm of the bellcrank lever 62 is offset inwardly such that its apertured end 62a lies above the center of the ball and socket connection 43. It accordingly describes an arc during its normal travel, the terminal points of which lie along a line which passes through the center of the ball 43. By this arrangement, throughout all of the various positions of the cylinder assembly 37 about its pivotal point of anchorage, the length and tension of the cable 76 remains substantially the same and the movement of the control element and the necessary operating forces will be substantially uniform throughout all of these positions.

The smaller arm of the bellcrank 62 extends substantially upwardly and is pivotally connected by means of the pivot bolt 63 to the tubular operating rod 64. The opposite terminal of the rod 64 is similarly pivoted by the pivot bolt 65 to the curved arm 66 of the bellcrank lever, the hub portion 68 of which is mounted for pivotal rotation on the pivot bolt 69. The remaining lever 67 of the bellcrank 66—67 extends outwardly to a pivotal connection 71 with the upper terminal of the locking pin 54. The pivot bolt 69 is suitably supported by the bearing bracket 70 which extends upwardly and rearwardly from the cylindrical guide recess 72 on the housing 55 to which the bracket 70 is fixedly attached. Intermediate its terminals the rod 64 is provided a clamp 73 which is suitably apertured for the forward terminal of the tension spring 74. The latter is suitably anchored at its rear terminal to the apertured end of the lug 75 which is pivotally carried upon the pivot bolt 61.

It will accordingly be seen that the tension spring 74 tends at all times to rotate the bellcrank 66—67 in a counterclockwise direction as viewed in Fig. 6 tending to urge the pin 54 into its locking position and that unlocking or outward movement of the pin 54 is accomplished by upward pull on the unlocking cable 76 imparting counterclockwise rotation to the bellcrank 62, elongation of the spring 74 and clockwise rotation of the bellcrank 66—67. The normal tension in the spring 74 is such that when all exterior forces applied to the terminal strut 33 of the strut assembly are removed the more powerful coil spring 58 restoring the cylinder to its normal or central position causes the sloping conic cam faces of the cap 52 to push the locking pin 54 outwardly against the action of the spring 74 until the pin becomes aligned with the annular recess 53 at which time the action of the spring 74 snaps the pin 54 into its latching relationship within the recess.

The landing gear is provided with separate locking assemblies to maintain the cantilever strut assembly 12 either in its retracted position or extended positions. The nacelle doors 93—94 are also interconnected with the strut assembly 12 such that the doors are automatically opened as the landing gear is extended, and closed again after the gear has been retracted. The locking mechanisms for holding the landing gear in its extreme positions each engage opposite sides of the strut locking collar elements 78 which are clamped about the upper portion 103 of the strut 12 by means of the bolt locks 79 on its front or forward side and 115 on the rear side, as more clearly shown in Figs. 2 and 4. As the landing gear reaches its retracted position as indicated by the dotted lines in Fig. 2 the bolt or pin portion 79 extending between the collar halves 78 engages the camming surface 80a of the latch 80. The latter is pivotally mounted at its lower portion upon the pivot 81 supported from the fuselage structure and is continually urged into its locking position by the piston-cylinder assembly 82 which is pivotally mounted upon its supporting structure 82p and pivoted to the latch 80 by the pivot pin 83. The piston-cylinder assembly 82 preferably contains a compression spring disposed between the free end of the cylinder and the piston such that the piston and its rod is urged into its telescoped relationship with the cylinder 82 thereby drawing the latch 80 rearwardly toward its engagement with the pin 79. It is therefore apparent that as the landing gear reaches its extreme retracted position it is automatically locked by engagement of the latch 80 with the pin 79. The operator may release the lock 79—80 by exerting pull upon the release cable 86 guided by suitable sheaves 87 and terminally engaged to the release rod 84 which is co-axially disposed within the compression spring 85 and which tends to permit the latch 80 to return to its locking position.

The doors 93—94 are each hinged upon longitudinal axes at 95 at the sides of the landing gear well such that they may be folded upwardly and inwardly towards each other in order to seal the opening. The transverse pivot shaft 23 has fixedly mounted thereon the right and left fittings 96 and 97 each of which are provided with downwardly extending arms 98. Push rods 99 are connected with the rods 98 by means of the universal joint connections 98a and the rods 99 are pivotally connected at their other terminals to the door operating levers 88 by means of the intermediate pivots 89. The door operating levers 88 are pivotally suspended from the fuselage structure by the pivot pins 88p and are pivotally connected at the outer pivot 90 to the door operating links 91 in turn pivotally connected to the doors by the universal connection at 92. Accordingly, it will be seen that as the cantilever strut assembly 12 is rotated downwardly into its extended position, the fittings 96 and 97 exert forward pull through the arms 98 and the intermediate push-pull rods 99 causing the door levers 88 to rotate forwardly about their pivots 88p. In doing so the lower terminals of the door levers 88 exert downward and forward movement of the push-pull door links 91 causing the doors to be swung outwardly about their longitudinal pivots 95 to permit the passage therebetween of the landing gear assembly 12 and the attached wheel 16. The retraction of the strut 12 and concurrent rotation of the transverse pivot shaft 23 with the attached fittings 96 and 97 causes a reverse operation of the described mechanism and drawing of the doors 93 and 94 together in order to seal or close the opening in the bottom of the fuselage 11. The doors are provided with outwardly offset portions, as indicated at 94a in Fig. 3 and are formed to closely cover and fair the wheel-carrying fitting 15 in its retracted position as indicated by the dotted lines in Fig. 2.

The locking mechanism for holding the landing gear assembly in its downwardly extended or operating position is generally indicated by the numeral 100 and is more clearly shown in Figs. 3, 4, 10 and 11. This assembly comprises a lock tapered pin 101 which is actuated by a cam 102 attached to the upper portion 103 of the oleo strut. The strut assembly 12 in moving to the extended position, carrying backwardly with it the cam 102, causes the latter to engage the roller 104 which is supported by the arms 105 from the parallel rods 106 and 107. These rods, which are disposed one above the other, are interconnected by the roller support fitting 105 for concurrent movement, being guided or slidably journalled in the fittings 108 and 109. The aforementioned locking pin 101 is carried upon the outer extremity of the upper rod 106 and is indicated in its retracted position by the dotted lines in Fig. 10 marked 101R. The opposite terminal of the rod 106 carries an abutment or piston element reciprocally mounted within the cylinder 110 within which there is disposed a compression spring (not shown) arranged such that the rod 106 and its attached pin 101 are continually urged outwardly into the locking position of the pin. The adjacent extremity of the lower rod 107 is also slidably journalled within the fittings 108 and 109, having its opposite extremity engaging within the spring-loaded piston and cylinder assembly 111. The spring-loaded piston cylinder units 110 and 111 are additionally supported from the fuselage framework by means of the clamp fitting 112.

As the upper portion 103 of the oleo strut 12, as viewed in Fig. 2, rotates in a clockwise direction about the axis of the transverse shaft 23 the cam 102 engaging the roller 104 causes the rods 106 and 107 to be telescoped within the cylinders 110 and 112 serving to retract the locking pin 101 into its dotted position 101R. The fitting 108 through which the locking pin 101 slides is slotted to receive the locking lug 113 which is attached between the bifurcated arms 114 supported by the collar bolt 115 of the collar 78. The stop 116 which is also attached to the oleo collar and the bifurcated arms 114 engages an adjustment screw 117 held in a stop block 118 which is attached between the side portions of the fitting 108, providing for properly positioning the locking lug 113 to receive the lock pin 101 which is forced therethrough by the spring-actuated piston rods 106 and 107. The lower piston rod 107 serves to guide the lock pin 101 and also provides for the adjustment of the limits of the travel of the locking pin. A third or intermediate piston rod 119 has a terminal attached to the cam roller supporting arm 105 and is slidably journalled within the fitting 108. The opposite terminal of the piston rod 119 is engaged by a hydraulic cylinder or jack 120 which is suitably connected by conduits to a controlled fluid pressure source whereby the operator can selectively cause outward actuation of the piston rod 119 and unlocking of the pin 101 for retraction of the landing gear. The hydraulic cylinder 120 is suitably supported from the aircraft structure by means of the supporting brackets 121.

It will therefore be seen that when the landing wheel 16 is in the extended position and the stabilizing strut 31 is unlocked or free to telescope, the wheel together with the wheel strut 14 is free to castor or swivel as the airplane is taxied or is moved along the ground. Turning of the wheel strut 14 is transmitted to the collar fitting 36 by the torque links 17 and 18. Accordingly, as the wheel 16 castors or causes rotation of the wheel strut 14 about its axis these movements are transmitted to the end of the piston element 33. Normal rotational movements of the wheel strut 14 are encountered in castoring or swivelling at relatively low rates of turning and are resiliently opposed by the spring 58 within the stabilizer unit 31, the spring serving to restore the wheel to its normal or central position after the disturbing forces have become dissipated or spent. When the nose wheel 16 is subjected to forces which impart sudden or rapid axial rotation to the wheel strut 14 resulting in a relatively high rate of turning and correspondingly high relative speed between the piston 41 and its cylinder 40 of the stabilizing device, the fluid within the cylinder 40 in passing through the orifices 42 serves to damp out these rapid rotational movements or oscillations which are more commonly known as shimmying. Any tendency of the nose wheel to "hunt" is also eliminated by the fluid damping feature of the stabilizing strut. Under certain conditions while the nose wheel is extended it is desirable that it be fixedly maintained in its normal central position and this is accomplished by releasing the able 76 and permitting the spring 74 and the locking pin 54 upon which it acts to engage the recess 53 and lock the stabilizing strut into its predetermined fixed length at which the nose wheel is centered.

The stabilizing strut 31 is also maintained in its locked or fixed length condition when the landing gear is being extended or retracted or maintained in its retracted attitude. It will be seen from an examination of Fig. 1 that as the main landing gear strut 12 is rotated about the transverse axis A—A for retraction of the gear the locked strut 31 serves as a drag strut by imparting a quarter turn or substantially 90° of rotation of the wheel strut 14 about its axis B—B causing the wheel 16 in the retracted position to lie in a substantially horizontal plane normal to the longitudinal vertical plane of the wheel in its extended position. Similarly, as the wheel is again dropped into its extended position the fixed length strut 31 being universally anchored at 32 to the aircraft structure and universally connected at 34 to the rotatable collar member 36, the wheel strut is again given a quarter turn in the opposite direction such that the wheel when extended is in a central aligned attitude. In order to then release the wheel for castoring or swivelling movements the pilot or operator exerts pull on the cable 76 latching the same into its tensioned or released position in which the pin 54 is withdrawn from the notch 53 and the assembly 31 is free to telescope against the resilient opposition of the spring 58 and the fluid damping effect created by telescoping movement of its apertured piston 41 within the cylinder 40.

Other forms and modifications of the present invention which may occur to those skilled in the art after a reading of the above specification, whether in respect to its general arrangement or detail design, are all intended to fall within the scope and spirit of the present invention as more particularly defined by the appended claims.

I claim:

1. In an aircraft landing gear, a relatively fixed aircraft structure, a main strut comprising a cylinder element supported from the said aircraft structure and a wheel-carrying piston element adapted for relative telescopic and rotational movements within said cylinder element, and a second strut universally interconnecting said piston element with the said aircraft structure said second strut including shock absorbing means for resiliently opposing said rotational movements in a plurality of telescoped positions of said main strut elements.

2. In an aircraft landing gear, a relatively fixed aircraft structure, a main shock absorber strut comprising an upper cylinder element supported from the aircraft and a wheel-carrying piston element adapted for telescopic and rotational movements within said cylinder element, shock absorbing means resiliently opposing said telescopic movements, and a second strut universally interconnecting said wheel-carrying element with said aircraft structure, the said second strut including shock absorbing means for resiliently opposing said rotational movements unaffected by telescoping movements of said main strut elements.

3. In an aircraft landing gear, a relatively fixed aircraft structure, a main strut comprising a cylinder element supported from said aircraft structure and a wheel-carrying piston element adapted for telescopic and rotational movements within said cylinder element, a member co-axially supported by said cylinder element for rotational movement thereon, torque arresting links interconnecting said member with said wheel-carrying element adapted for relative axial movements therebetween and an oleo strut flexibly connected to said member and said aircraft structure adapted to resiliently oppose said rotational movements while permitting telescoping of said main strut.

4. In an aircraft landing gear, a relatively fixed aircraft structure, a cylinder element mounted upon said aircraft structure, a wheel-carrying piston element supported by said cylinder element for axial and rotative movements within said cylinder element, a member co-axially mounted upon said cylinder element to rotate with said wheel-carrying element while restrained from axial movements with respect to said cylinder element, and a telescoping piston-cylinder device connecting said rotatable member to said aircraft structure, said device comprising fluid means for damping said rotative movements, resilient means opposing said fluid means for restoring a telescopic relationship of said device at which said wheel-carrying strut is rotated into a predetermined position with respect to said aircraft structure, and means for locking said device in said relationship for maintaining said wheel in said predetermined position.

5. In an aircraft landing gear, a relatively fixed aircraft structure, a wheel-carrying strut rotatably supported from said aircraft structure for swivelling movements, a stabilizing strut comprising telescoping elements, one of said elements having a terminal pivotally connected to rotate with said first strut, the other of said elements having a terminal pivotally connected to said aircraft structure, and fluid means contained within said stabilizing strut opposing telescoping of said elements for damping shimmying movements of said swivelling strut.

6. In an aircraft landing gear, a relatively fixed aircraft structure, a cylinder element mounted upon said aircraft structure, a wheel-carrying element supported within said cylinder element for axial and rotative movements with respect thereto, a member mounted to rotate with said wheel-carrying element restrained from axial movements with respect to said cylinder element, and a telescoping piston-cylinder device connecting said member to said aircraft structure including fluid means for damping said rotative movements.

7. In an aircraft landing gear, a relatively fixed aircraft structure, a cylinder element mounted upon said aircraft structure, a wheel-carrying piston element supported within said cylinder element for axial and rotative movements with respect thereto, a member mounted upon said cylinder element to rotate with said wheel-carrying element but restrained from axial movements with respect to said cylinder element, a telescoping piston-cylinder device connecting said member to said aircraft structure including fluid means for damping said rotative movements, and resilient means opposing said fluid means for restoring a telescoped relationship of said device at which said wheel-carrying element is rotated into a predetermined position with respect to said aircraft structure.

8. In a retractable landing gear for aircraft, a relatively fixed aircraft structure, a main strut comprising an upper cylinder element pivotally supported from the aircraft structure and a wheel-carrying piston element adapted for telescopic and rotative movements with respect thereto, shock absorbing means resiliently opposing said telescopic movements of said main strut, a member coaxially mounted upon said upper element for rotative movements with respect thereto, torque arresting links interconnecting said member with said wheel-carrying element permitting relative axial movements and preventing rotational movements therebetween, and a telescopic device interconnecting the said member with the aircraft structure including means for fluidly damping out rapid rotative movements, resiliently opposing normal rotative movements, and adapted to rotate said wheel-carrying element with respect to said cylinder element upon retraction of said landing gear.

9. In a retractable landing gear for aircraft, a cylinder element pivotally mounted upon the aircraft, a wheel-carrying element supported by said cylinder element for axial and rotative movements with respect thereto, a member mounted to rotate with said wheel-carrying element restrained from axial movements with respect to said cylinder element, actuating means for rotating said landing gear about said pivotal mounting for retraction and extension of the gear, and a strut element connected to said member and to the aircraft adapted to impart rotation to said wheel-carrying element through substantially a quarter turn with respect to said cylinder element upon extension and retraction of said landing gear about said pivotal mounting.

10. In a retractable aircraft landing gear, a cylinder element pivotally mounted upon the aircraft, a wheel-carrying element journalled within said cylinder element for axial and rotative movements with respect thereto, a member mounted to rotate with said wheel-carrying element restrained from axial movements with respect to said cylinder element, actuating means for rotating said landing gear about said pivotal mounting for extension and retraction with respect to the aircraft, and a telescoping piston-cylinder device connecting said member to the aircraft, said device comprising fluid means for damping said rotative movements, resilient means opposing said fluid means for restoring said wheel to its normal central position with respect to said aircraft in the extended position and means for locking said device in its said normal relationship adapted to impart a quarter turn rotation to said wheel-carrying element with respect to said cylinder element during retraction.

11. In a retractable landing gear, in combination with a relatively fixed aircraft structure, a cylinder element adjustably supported on the aircraft structure, a wheel-carrying element rotatably supported from said cylinder element, and an extensible device flexibly connecting said wheel-carrying element with the aircraft structure, said device including fluid means for damping rapid rotation of said wheel-carrying element, resilient means for restoring said device to a predetermined length and means for locking said device at said length whereby predetermined rotational positions are imparted to said wheel-carrying element as said landing gear is extended and retracted.

12. In an aircraft landing gear, the combination with a retractable shock absorbing strut having its cylinder element rotatably supported by the aircraft and its wheel-carrying piston element journalled for axial and rotational movements within said cylinder element, of a combined stabilizer strut flexibly connected to said wheel-carrying element and to said aircraft adapted to selectively stabilize rotational movements of said wheel-carrying element when extended and to impart rotation to said wheel-carrying element with respect to the said cylinder element during retraction of said shock absorbing strut.

13. In an aircraft landing gear, the combination with a retractable shock absorbing strut having its cylinder element rotatably supported by the aircraft and its wheel-carrying piston element journalled for axial and rotational movements within said cylinder element, and a member journalled upon said cylinder element and linked to said wheel-carrying element such that the rotational movements of the latter are imparted to said member but said axial movements with respect to said cylinder element are prevented, of a lockable shimmy damper strut connected to said wheel-carrying element and to said aircraft adapted when unlocked to damp out rotational shimmying movements of said wheel-carrying element when said gear is extended, and when locked to impart rotation to said member and said wheel-carrying element with respect to said cylinder element during retraction of said shock absorbing strut.

14. In an aircraft having a relatively fixed structure, a shock absorber supported from said structure including dual telescopic elements adapted for cushioning axial forces, a member mounted therewith for relative rotational movements with respect to the first said shock absorber element and for relative axial movements with respect to the second said shock absorber element, torque links interconnecting said member with said second shock absorber element for preventing relative rotation therebetween, and a telescopic device connecting said member with said aircraft structure, said device including means for damping said rotational movements unaffected by said axially cushioned forces.

15. An aircraft landing gear comprising a cylinder element supported from a relatively fixed aircraft structure, a wheel-carrying piston element supported within said cylinder element for axial and rotative movement with respect thereto, a member rotatably mounted upon said cylinder element adapted to rotate with said wheel-carrying element while restrained from axial movement with respect to said cylinder element, and shimmy damping means directly connecting said rotatable member to said fixed aircraft structure adapted to arrest shimmying induced by said rotative movements.

16. In an aircraft landing gear including an upper member carried by the aircraft and a wheel-carrying member rotatable with respect to said upper member, a stabilizing strut comprising a piston element fixed to one terminal of the strut, a fluid-containing cylinder element fixed to the other terminal, the terminals of said strut being connected to said aircraft and to said rotatable member, resilient means interposed between said cylinder and piston element for restoring a predetermined axial relationship therebetween, and means mounted upon said piston element adapted to automatically engage and lock the same to said cylinder element when said relationship has been restored for the prevention of said rotating movement of said wheel-carrying member with respect to said upper member.

17. In an aircraft landing gear including an upper member carried by the aircraft and a lower member castorable with respect thereto, a stabilizing strut comprising a piston element fixed to one terminal of the strut, a fluid-containing cylinder element fixed to the other terminal, said strut being connected at its terminals between said aircraft and said castorable member, resilient means interposed between said cylinder and piston elements for restoring a predetermined telescoped relationship between said elements, locking means pivotally mounted upon said piston element adapted to automatically engage a mating portion of the said cylinder element when said predetermined relationship has been restored to prevent said castoring movement, and manually controlled mechanism for the disengagement of said locking means to permit the castoring of said member.

ERIC L. MARTIN.